C. RENSHAW.
SYSTEM OF ELECTRIC MOTOR CONTROL.
APPLICATION FILED NOV. 24, 1911.

1,069,472.

Patented Aug. 5, 1913.

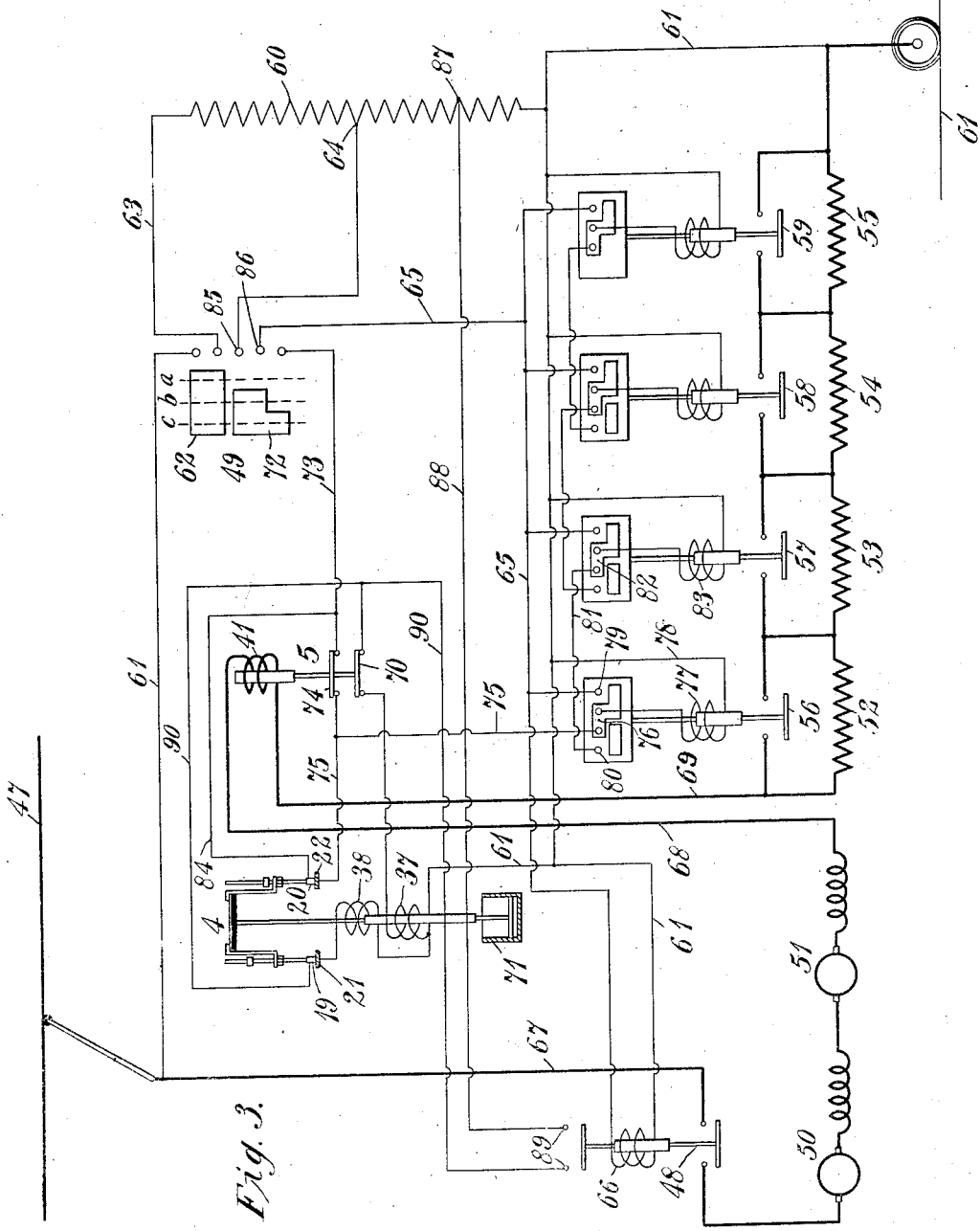

UNITED STATES PATENT OFFICE.

CLARENCE RENSHAW, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

SYSTEM OF ELECTRIC-MOTOR CONTROL.

1,069,472.

Specification of Letters Patent.

Patented Aug. 5, 1913.

Application filed November 24, 1911. Serial No. 662,181.

*To all whom it may concern:*

Be it known that I, CLARENCE RENSHAW, a citizen of the United States, and a resident of Edgewood Park, in the county of Allegheny and State of Pennsylvania, have invented a new and useful Improvement in Systems of Electric-Motor Control, of which the following is a specification.

My invention relates to systems of electric motor control and it has special reference to systems which embody automatic controllers, or automatic means for effecting motor acceleration.

In Patent No. 889,907, granted June 9, 1908, to the Westinghouse Electric & Manufacturing Company, upon an application filed by William Cooper, is shown and described a time-limit relay switch which is so combined with a current-limit relay switch as to effect the gradual acceleration of the motor even if the current traversing the motor circuit exceeds the predetermined value at which the current relay is permitted to close.

My present invention has for its object to provide an improved time-limit relay switch of the same character, in general, as that set forth in the above-named patent.

In addition to the results heretofore secured, I materially improve the reliability of the apparatus embodying quick acting switches by avoiding the possibility of effecting two successive steps in the acceleration of the motors with excessive rapidity, in cases when the time-limit relay would otherwise close almost immediately after the current-limit relay is closed.

I accomplish the aforesaid objective results by specially constructing the current-limit relay switch and by electrically associating and interlocking the current and time-limit relay switches, as hereinafter more fully pointed out.

Figure 1:
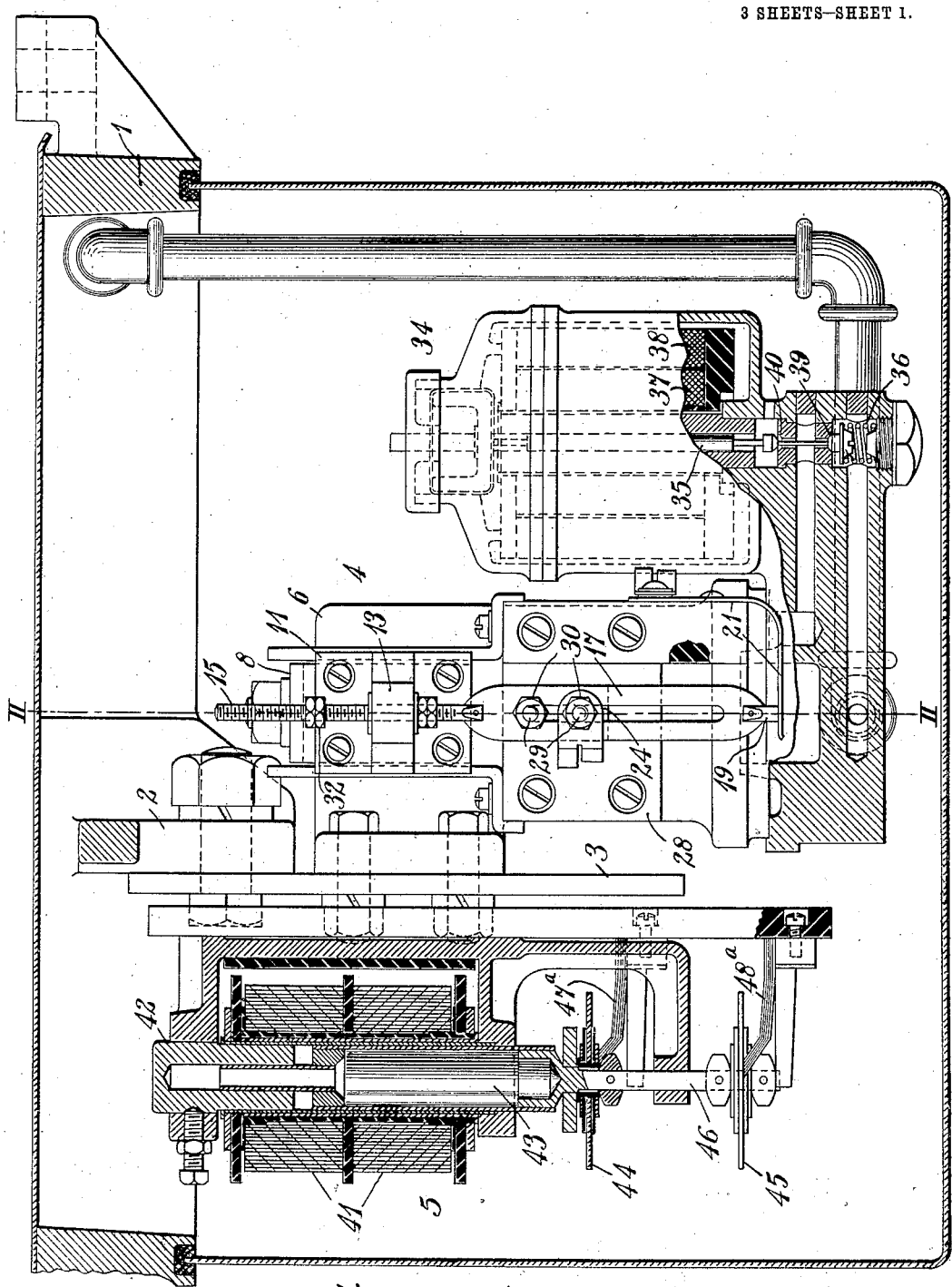
Figure 2:
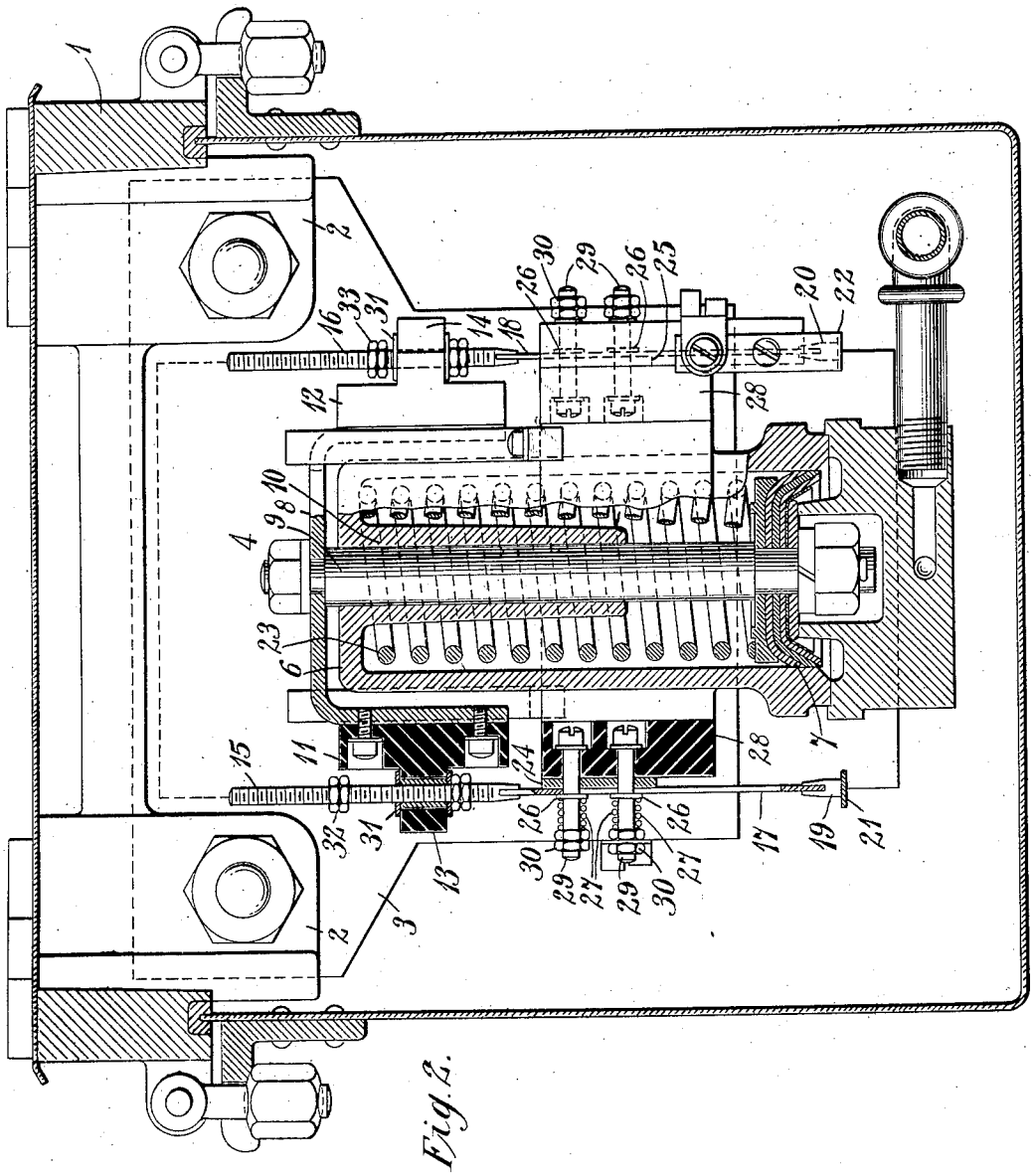

Figure 1 of the accompanying drawings is an elevation, partially in section, of a current-limit relay and a time-limit relay constructed and arranged in accordance with my invention. Fig. 2 is a view, partially in elevation and partially in section, at right angles to Fig. 1, the sectional portion being on the line II—II of Fig. 1. Fig. 3 is a diagrammatic view of a system of control embodying the relay switches illustrated in the other figures, the electro-magnets for actuating the valve which controls the time-limit relay switch in Figs. 1 and 2, being arranged in Fig. 3 to act directly on the moving parts of the switch for effecting the same result.

It will, of course, be understood that my invention is not limited to the structural details illustrated or to the simple control system of Fig. 3, since the invention may be applied to various railway and industrial control systems embodying one or more electric motors.

Referring to Figs. 1 and 2 of the drawings, the structure here shown comprises a stationary frame 1, which is adapted to be secured to the under side of the floor or deck of an electric car or locomotive, having downwardly extending projections 2, to which is removably attached a supporting plate 3 for a time-limit relay switch 4 and a current-limit relay switch 5. The time-limit relay switch 4 comprises a cylinder 6, a piston 7 operating therein, an external U-shaped bracket 8 and a piston rod 9 which is slidably mounted in a bearing 10 provided at one end of the cylinder 6 and is interposed between the piston 7 and the bracket 8. Insulating blocks 11 and 12 are secured to the arms of the U-shaped bracket 8 and are provided with projections 13 and 14 through which screw-threaded rods 15 and 16 extend, in lines, which are substantially parallel to the line of action of the piston rod. Longitudinally slotted strips 17 and 18 of conducting material are secured to the lower ends of the screw-threaded rods 15 and 16 and are provided with movable contact members 19 and 20 at their lower ends which are respectively adapted to engage stationary contact members 21 and 22 when the piston 7 and the screw-threaded rods 15 and 16 occupy their lowest positions. The piston is normally held in its lowest position by means of a helical spring 23 which is located inside of the cylinder in the usual way and is compressed when pneumatic or other fluid pressure is admitted to the cylinder under the piston 7. The conducting strips 17 and 18 are adapted to slide over stationary contact blocks 24 and 25 against which they are pressed by washers 26 backed by small springs 27. The contact blocks 24 and 25 are mounted on stationary insulating blocks 28 from which bolts 29 extend through the slots in the strips 17 and 18, the washers 26 and the springs 27 being mounted on the outer ends of the bolts and held in position by nuts 30. The projections 13 and 14 of the blocks 11 and 12 are provided with bushings or sleeves 31 through which the rods 15 and 16 operate freely, and the rods are provided with lock nuts 32 and 33 above the projections. When fluid pressure is admitted to the cylinder, the piston is raised and carries with it the U-shaped bracket 8 and the blocks 11 and 12, the separation of the contact members 19 and 21, and 20 and 22 being delayed according to the position of the lock nuts 32 and 33 on the rods 15 and 16 and the rods being picked up and the movable contact members lifted from the stationary members by the projections 13 and 14. The lock nuts 33 are adjusted so that the contact members 20 and 22 are separated near the beginning of the piston stroke, while the lock nuts 32 are so located that the contact members 19 and 21 are separated when the piston is substantially at the end of its stroke.

The admission of fluid pressure to the cylinder 6 is governed by a magnet valve 34 having a valve stem 35 which is forced downwardly in opposition to a spring 36 when either one or both of a pair of magnet coils 37 and 38 are energized. The valve is double acting and, when the electro-magnets are deënergized, closes the admission port 39 and opens an exhaust port 40, the admission port being opened and the exhaust port closed when the magnets are energized. The current-limit relay switch 5 comprises a two-part magnet coil 41, a stationary core member 42, a movable core member 43, movable contact members 44 and 45 secured to an extension 46 of the movable core member 43, and stationary contact members 47$^a$ and 48$^a$. The movable contact members 44 and 45 may be of any suitable form, but I prefer to utilize disks of conducting material which are supported upon, and insulated from the extension or stem 46.

The operation of the relay switches will best be understood by reference to the diagram of Fig. 3, in which the system illustrated comprises a supply circuit conductor 47, a line switch 48, a master switch 49, electric motors 50 and 51, resistor sections 52, 53, 54 and 55, accelerating switches 56, 57, 58 and 59 which are severally adapted to short circuit the resistor sections, an auxiliary resistor 60, the time-limit relay switch 4, the current-limit relay switch 5 and opposite line conductor 61.

The operation of and the circuit connections for the system are as follows: Assuming that the switches occupy the positions shown in the diagram, if the master switch 49 occupies position $a$, a circuit is first established from line conductor 47, through contact member 62 of the master switch, conductor 63 and resistor 60 to opposite line conductor 61. In position $b$, an auxiliary circuit is also established from an intermediate point 64 in the resistor 60 through contact fingers 85 and 86 and contact member 72 of master switch 49, conductor 65 and coil 66 of switch 48 to conductor 61. The coil 66, when energized, closes the line switch 48 and completes a motor circuit from conductor 47, through conductor 67, switch 48, motors 51 and 52, conductor 68, coil 41 of relay switch 5, conductor 69 and resistor sections 52 to 55, inclusive, to conductor 61. When line switch 48 is closed, another control circuit is established from a tap 87 of resistor 60, conductor 88, contact terminals 89, conductor 90, contact members 19 and 21 and coil 38 of time-limit relay switch 4, to opposite line conductor 61. The energized coil 38 actuates the relay switch and, when its upper position is reached, the contact members 19 and 21 are separated, thereby interrupting the circuit and permitting the movable member of the switch to fall in opposition to the dash pot 71. The current traversing the motor circuit when it is first closed is sufficiently large to actuate the current-limit switch 5 in the usual manner. The switch 5 is held open until the current traversing the motor circuit falls below a predetermined amount by reason of the acceleration and the increased counter-electromotive force of the motors. If the master switch occupies position $c$, the acceleration of the motor is automatically effected but the acceleration may be halted at any step by moving the switch into position $b$.

If the motor load is light, the current-limit relay switch 5 will close considerably before the time-limit relay switch 4 and, when closed, a circuit is established, provided the master switch is in position $c$, from contact segment 72 through conductor 73, contact terminals 74 of relay switch 5, conductor 75, auxiliary contact terminal 76 of resistance switch 56, coil 77 and conductor 78 to line conductor 61. The first resistance switch is thus closed and, in closing, its coil 77 is transferred to a holding circuit which is established from conductor 65 and contact finger 79 in the usual manner. The control circuit from conductor 75, which depends upon the relay switch 5, is now completed through contact finger 80, conductor 81 and contact member 82 to coil 83 of resistance switch 57. In a similar manner, the switches 58 and 59 are closed in succession and are held closed by a holding circuit from conductor 65, the action of each switch being delayed until the current-limit switch 5 is closed. If, on the other hand, the load on the motors is heavy, so that the current limit switch 5 remains open for a considerable period after the line switch 48 is closed, the speed of the motors will now be automatically accelerated under the control of the time limit switch 4 in the following manner: As was stated above, the time limit switch 4 is opened by the action of the coil 38 which is energized through the switch contact members 89 in the control circuit when the line switch 48 is closed by the movement of the master controller from position $a$ to position $b$. The contact members 20 and 22 are separated immediately as the piston 7 of the time limit switch 4 begins to rise, while the contact members 19 and 21 are not separated until near the end of the stroke of the piston 7, this effect being obtained by suitably adjusting the lock nuts 32 and 33, as hereinbefore explained. The prompt opening of the contact members 20 and 22 insures that the controlling circuit for the resistance switches 56 and 59, when the master controller has been moved into position $c$, shall be held open throughout the time taken by the piston 7 in rising to the end of its stroke and descending again against the action of the dash pot 71. On the other hand, by delaying the opening of the contact members 19 and 21, the proper length of stroke of the piston 7 is insured. When the piston 7 ceases to rise, both of the movable contact members 19 and 20 are held by the frictional engagement of the spring pressed washers 26 against the strips 17 and 18 in the open position to which they have been moved, until they are again moved down by the projections 13 and 14 engaging the lower lock nuts on the rods 15 and 16, respectively, as the piston 7 descends under the control of the dash pot 71. If the master controller 49 is moved into the position $c$ for automatic acceleration, immediately after reaching position $b$, the time limit switch 4 will be opened, and, until it has again closed, no further acceleration of the motors will take place. Bearing in mind that the current limit switch 5 is still held open, as soon as the time limit switch 4 has closed, a control circuit is completed from conductor 73, through conductor 84 in shunt to the current limit switch 5, and through the contact members 20 and 22, conductor 75, coil 77 of the first resistance switch 56 and conductor 78 to the line conductor 61. The first resistance switch 56 is thus closed and is retained closed by the holding circuit already referred to. Simultaneously, the circuit of the coil 38 of time limit switch 4 is closed at the contact members 19 and 21 and this switch is again opened, thus interrupting the control circuit through conductor 75 at the contact members 20 and 22 before the second resistance switch 57 has time to close. After a definite predetermined interval of time, the switch 4 again closes under the control of the dash pot 71 and permits the second resistance switch 57 to be closed. Thus, the resistance switches are closed successively, after definite intervals of time, to cut resistance out of the motor circuit, irrespective of the current limit switch 5. If, while the motors are accelerating, the motor current becomes sufficiently reduced to allow the current limit switch 5 to close shortly before the time limit switch 4 is timed to close, the circuit of the winding 37 of time limit switch 4 will thereby be closed by the auxiliary contact member 70 of current limit switch 5, and the piston of the time limit switch 4 will be returned to the upper limit of its stroke, or be held there if it happens to be in that position at the instant of closure of the current limit switch 5. If now, a temporary increase of motor current is obtained and if it is sufficient to again open the switch, the current in the coil 37 will be interrupted at the contact member 70 of the current limit switch 5 and the time limit switch 4 will thus be permitted to close again, but only after the lapse of the predetermined length of time for which the dash pot 71 is adjusted.

It will usually be impossible for the current limit switch 5 to close immediately after the time limit switch 4 if the motors are still accelerating, because the closing of the time limit switch 4 will cause the next following resistance switch to close and will thus cause an increased motor current in the coil 41 of the current limit switch 5. Since, by supposition, a sufficient current was previously traversing the coil 41 to tend to hold switch 5 open, it is evident that the increase of the motor current due to the action of the time limit switch 4 could only increase the tendency of switch 5 to remain open and could not, in any case, cause it to at once move from the open to the closed position. If, on the other hand, the motors accelerate so rapidly after the last closure of the time limit switch 4 as to enable the current limit switch 5 to close an appreciable, though short, time after the said last closure of the time limit switch 5, the conditions are such that it would be quite proper and harmless to close the next following resistance switch, notwithstanding that the full period of time for which the time limit switch 4 is set to act had not quite elapsed since the last was closed.

In actual operation, it is impossible for the time limit switch 4 to close immediately after the current limit switch 5 or at any time while the latter switch is in the closed position, for the reason that the time limit switch 4 could not again close until the current limit switch 5 was again opened by the motor current and even then the full time for which the dash pot 71 of the time limit switch 4 was adjusted would have to elapse between the opening of the current limit switch 5 and the closing of the time limit switch 4. If the time limit switch 4 closes so soon before the current limit switch 5 that both of these switches act upon the same resistance switch it is evident that no harm can result as they both act together to produce the same effect.

Modifications of my invention are intended to be covered in the appended claims.

I claim as my invention:

1. A system of electric motor control comprising means for effecting motor acceleration, a current-limit relay, and a time-limit relay embodying a plurality of actuating means, one of which is dependent upon the closure of the current-limit relay.

2. A system of electric motor control comprising means for effecting motor acceleration, a current-limit relay for delaying the accelerating means and a time-limit relay having one actuating coil which is periodically energized independently of the current-limit relay and one actuating coil the energization of which is dependent upon the closure of the current-limit relay.

3. A system of electric motor control comprising a plurality of independently operated switches adapted to close in a predetermined sequence, means dependent upon the current traversing the motor circuit for automatically suspending the closure of the switches, and means actuated by the first named means for limiting the suspension to a predetermined maximum time.

4. A control system for electric motors comprising a plurality of independently operated switches adapted to close in a predetermined sequence, a current-limit relay for automatically suspending the closure of the switches, and means actuated by the closure of the current-limit relay for limiting the suspension to a predetermined maximum time.

5. A control system for electric motors comprising a plurality of independently operated switches adapted to close in a predetermined sequence, a current-limit relay for automatically suspending the closure of the switches, and a time-limit relay for limiting the suspension to a predetermined maximum time and embodying means for preventing the closure of the current-limit and the time-limit relays in rapid succession.

6. A control system for electric motors comprising a plurality of independently operated switches adapted to close in a predetermined sequence, a current-actuated device for automatically suspending the closure of the switches, and a time-limit device for restricting the suspension effected by the current device to a predetermined maximum time and embodying means for preventing the time-limit device from becoming effective soon after the current device has acted.

7. A control system for electric motors comprising means for effecting motor acceleration, a current-limit relay switch for automatically suspending the action of the accelerating means, and a time-limit relay switch for restricting the suspension effected by the current-limit relay switch to a predetermined maximum time and embodying means for preventing the time-limit relay switch from closing soon after the current-limit relay switch has closed.

8. A control system comprising a motor, means for effecting acceleration of the motor, a current-limiting device and a time-limiting device for delaying the motor acceleration, and means dependent upon the closing of the current-limiting device for opening the time-limiting device.

9. A control system comprising a current relay switch and a second relay switch, a contact member which normally effects a regular periodic action of said second relay switch, and an independent contact member which restarts the periodic action dependent upon the closing of the current relay switch.

10. A control system comprising a motor, accelerating means therefor, a current relay switch, and a time-limit relay switch having two actuating coils and two sets of coöperating stationary and movable contact members, energization of one of said coils being dependent upon one set of said contact members, energization of the other coil being dependent upon the current relay switch, and the second set of said contact members being adapted to complete a shunt circuit to said current relay switch.

In testimony whereof, I have hereunto subscribed my name this 21st day of Nov., 1911.

CLARENCE RENSHAW.

Witnesses:
M. B. CARPENTER,
B. B. HINES.